US007493390B2

(12) United States Patent
Bobde et al.

(10) Patent No.: US 7,493,390 B2
(45) Date of Patent: Feb. 17, 2009

(54) METHOD AND SYSTEM FOR SUPPORTING THE COMMUNICATION OF PRESENCE INFORMATION REGARDING ONE OR MORE TELEPHONY DEVICES

(75) Inventors: Nikhil P. Bobde, Redmond, WA (US); Robert Brown, Kirkland, WA (US); Jeremy T. Buch, Redmond, WA (US); Vishwajith Kumbalimutt, Redmond, WA (US); David J. Simons, Redmond, WA (US); Zachary Taylor, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 11/332,507

(22) Filed: Jan. 13, 2006

(65) Prior Publication Data
US 2006/0190591 A1   Aug. 24, 2006

Related U.S. Application Data

(63) Continuation of application No. 10/145,912, filed on May 15, 2002, now abandoned.

(51) Int. Cl.
G06F 15/173 (2006.01)
(52) U.S. Cl. .................. 709/224; 709/223; 709/225; 709/206
(58) Field of Classification Search ......... 709/223–225, 709/206
See application file for complete search history.

(56) References Cited

U.S. PATENT DOCUMENTS

| 4,570,227 A | 2/1986 | Tachi et al. |
| 5,179,519 A | 1/1993 | Adachi et al. |
| 5,220,507 A | 6/1993 | Kirson |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,608,635 A | 3/1997 | Tamai |
| 5,611,050 A | 3/1997 | Theimer et al. |

(Continued)

OTHER PUBLICATIONS

Habel. "Incremental Generation of Multimodal Route Instructions," http://www.cs.niu.edu/~nlgdial/final/SS703CHabel.pdf, last access Dec. 11, 2006, 8 pages, Hamburg, Germany.
Mark Weiser, The Computer for the 21st Century, Scientific American, Sep. 1991, 8 pages.
Eugenio, et al. "Generating driving directions for intelligent vehicles interfaces," 12th IEEE International Conference and Workshops on the Engineering of Computer-Based Systems, 2005, 8 pages.
"MapmyIndia Rocks Indian Web2.0 with GoogleMap Type Digitised Mapping," http://www.webyantra.net/tag/mashup/, last accessed Mar. 16, 2007, 8 pages.

(Continued)

Primary Examiner—Kenny S Lin
Assistant Examiner—Duyen M Doan
(74) Attorney, Agent, or Firm—Merchant & Gould P.C.

(57) ABSTRACT

A system for detecting and communicating the presence of one or more computing devices is presented. The invention also presents a method and system for aggregating presence information generated by multiple devices associated with a single user. A server acting as a presence agent on behalf of a first user receives and responds to a subscription request generated by a computing device operated by a second user that wishes to be permitted as a watcher of the first user. When the second user corresponds to access preferences specified by the first user, a notify message is sent to the second user's device that includes presence information indicative of an activity level and availability level associated with the first user. When the first user employs multiple computing devices, the server generates an aggregate presence document that is representative of the overall presence of the first user.

17 Claims, 8 Drawing Sheets

U.S. PATENT DOCUMENTS

| | | | |
|---|---|---|---|
| 5,812,865 | A | 9/1998 | Theimer et al. |
| 5,835,881 | A | 11/1998 | Trovato et al. |
| 5,911,773 | A | 6/1999 | Mutsuga et al. |
| 6,078,865 | A | 6/2000 | Koyanagi |
| 6,119,065 | A | 9/2000 | Shimada et al. |
| 6,298,304 | B1 | 10/2001 | Theimer |
| 6,339,746 | B1 | 1/2002 | Sugiyama et al. |
| 6,466,232 | B1 | 10/2002 | Newell et al. |
| 6,477,460 | B2 | 11/2002 | Kepler |
| 6,513,046 | B1 | 1/2003 | Abbott, III et al. |
| 6,526,350 | B2 | 2/2003 | Sekiyama |
| 6,549,915 | B2 | 4/2003 | Abbott, III et al. |
| 6,622,089 | B2 | 9/2003 | Tamotsu et al. |
| 6,694,252 | B2 | 2/2004 | Ukita |
| 6,728,635 | B2 | 4/2004 | Hamada et al. |
| 6,747,675 | B1 | 6/2004 | Abbott et al. |
| 6,748,225 | B1 | 6/2004 | Kepler |
| 6,791,580 | B1 | 9/2004 | Abbott et al. |
| 6,801,223 | B1 | 10/2004 | Abbott et al. |
| 6,807,423 | B1 * | 10/2004 | Armstrong et al. ........... 455/440 |
| 6,812,937 | B1 | 11/2004 | Abbott et al. |
| 6,839,735 | B2 * | 1/2005 | Wong et al. ................. 709/204 |
| 6,842,877 | B2 | 1/2005 | Robarts et al. |
| 6,853,634 | B1 * | 2/2005 | Davies et al. ............... 370/349 |
| 6,898,518 | B2 | 5/2005 | Padmanabhan |
| 6,952,647 | B2 | 10/2005 | Hasegawa et al. |
| 7,007,085 | B1 * | 2/2006 | Malik ......................... 709/224 |
| 7,035,923 | B1 * | 4/2006 | Yoakum et al. ............. 709/224 |
| 7,103,473 | B2 | 9/2006 | Ranjan |
| 7,215,760 | B2 * | 5/2007 | Lenard .................. 379/266.07 |
| 2001/0007968 | A1 | 7/2001 | Shimazu |
| 2001/0025223 | A1 | 9/2001 | Geiger et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott et al. |
| 2002/0052930 | A1 | 5/2002 | Abbott et al. |
| 2002/0052963 | A1 | 5/2002 | Abbott et al. |
| 2002/0054174 | A1 | 5/2002 | Abbott et al. |
| 2002/0080155 | A1 | 6/2002 | Abbott et al. |
| 2002/0083025 | A1 | 6/2002 | Robarts et al. |
| 2002/0087525 | A1 | 7/2002 | Abbott et al. |
| 2002/0164998 | A1 | 11/2002 | Younis |
| 2002/0173905 | A1 | 11/2002 | Jin et al. |
| 2003/0041101 | A1 * | 2/2003 | Hansche et al. ............. 709/203 |
| 2003/0046401 | A1 | 3/2003 | Abbott et al. |
| 2003/0110228 | A1 * | 6/2003 | Xu et al. ..................... 709/207 |
| 2003/0182052 | A1 | 9/2003 | DeLorme et al. |
| 2005/0034078 | A1 | 2/2005 | Abbott et al. |
| 2006/0031062 | A1 | 2/2006 | Bakis et al. |
| 2006/0212220 | A1 | 9/2006 | Bou-Ghannam et al. |
| 2006/0271277 | A1 | 11/2006 | Hu et al. |

OTHER PUBLICATIONS

Koleszar. "A Landmark-Based Location Reference Grid for Street Maps," http://stinet.dtic.mil/oai/oai?&verb=getRecord&metadataPrefix=html&identifier=ADA070048, Defense Technical Information Center, Jun. 1, 1979, 1 pages.

"PDA Toshiba," http://www.citynotebookcentre.com.au/Products/PDA&CELL/Toshiba/toshiba_pda_e740.htm, last accessed Sep. 24,, 2008, 5 pages.

Hampe et al. "Integrating topographic information and landmarks for mobile navigation," http://www.ikg.uni-hannover.de/publikationen/publikationen/2003/wien_hampre_elias.pdf, last accessed Mar. 14, 2007, 13 pages.

May et al. "Presence and Quality of Navigational Landmarks: Effect on Driver Performance and Implications for Design," http://magpie.lboro.ac.uk/dspace/bitstream/2134/2277/1/PUB284.pdf, last accessed Mar. 14, 2007, 40 pages, Loughborough, United Kingdom.

Case Study - Assessing Spatial Distribution of Web Resources for Navigation Services, Department of Geomatics, University of Melbourne, Australia, CRC for Spacial Information, 15 pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38 - No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36 - No. 7.

Roy Want, et al., The Active Badge Location System, ACM Transactions on Information Systems, Jan. 1992, pp. 91-102, vol. 10 - No. 1.

Mark Weiser, Some Computer Science Issues in Ubiquitous Computing, Communications of the ACM, Jul. 1993, pp. 75-84, vol. 36 - No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8 - No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

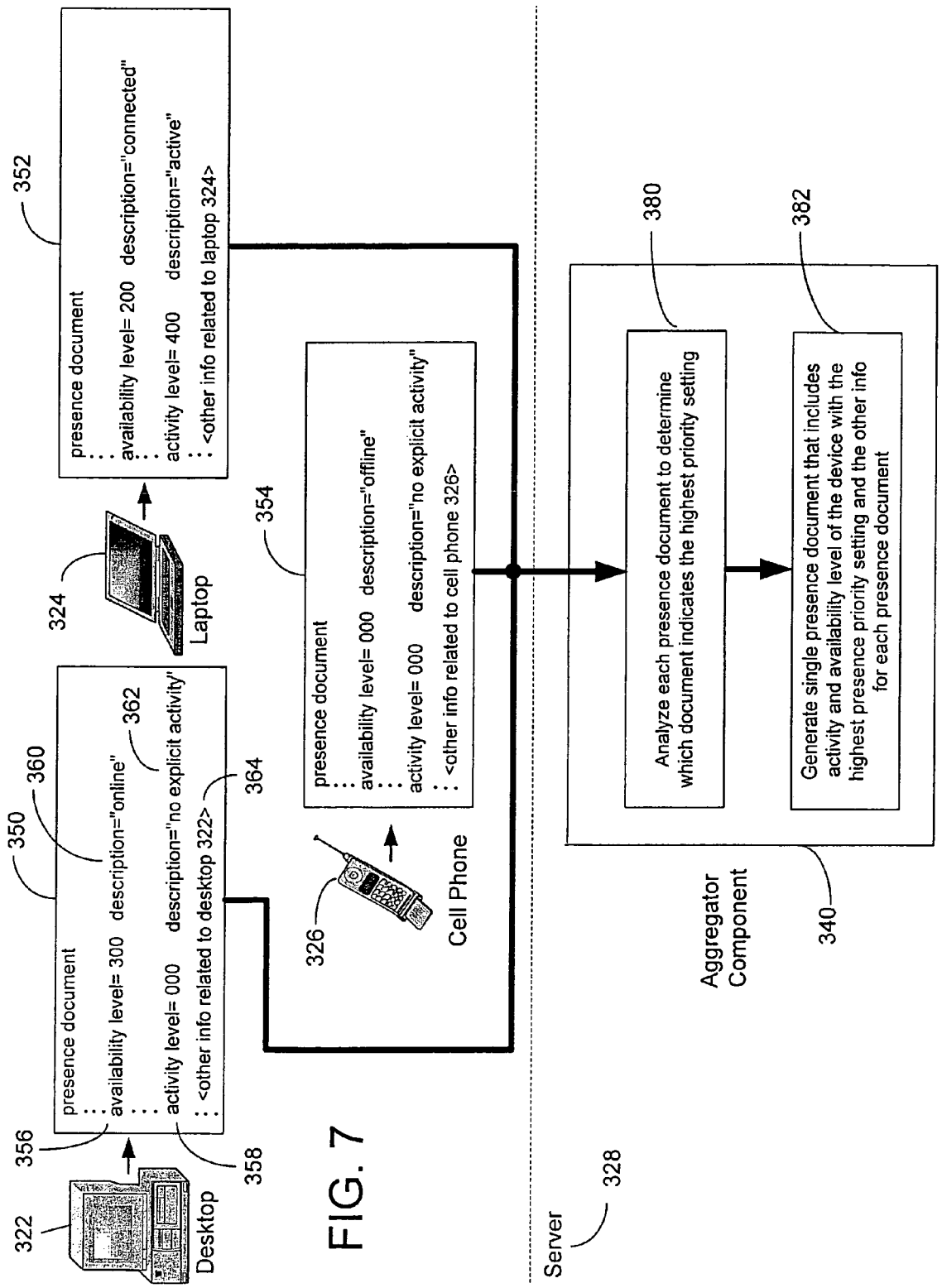

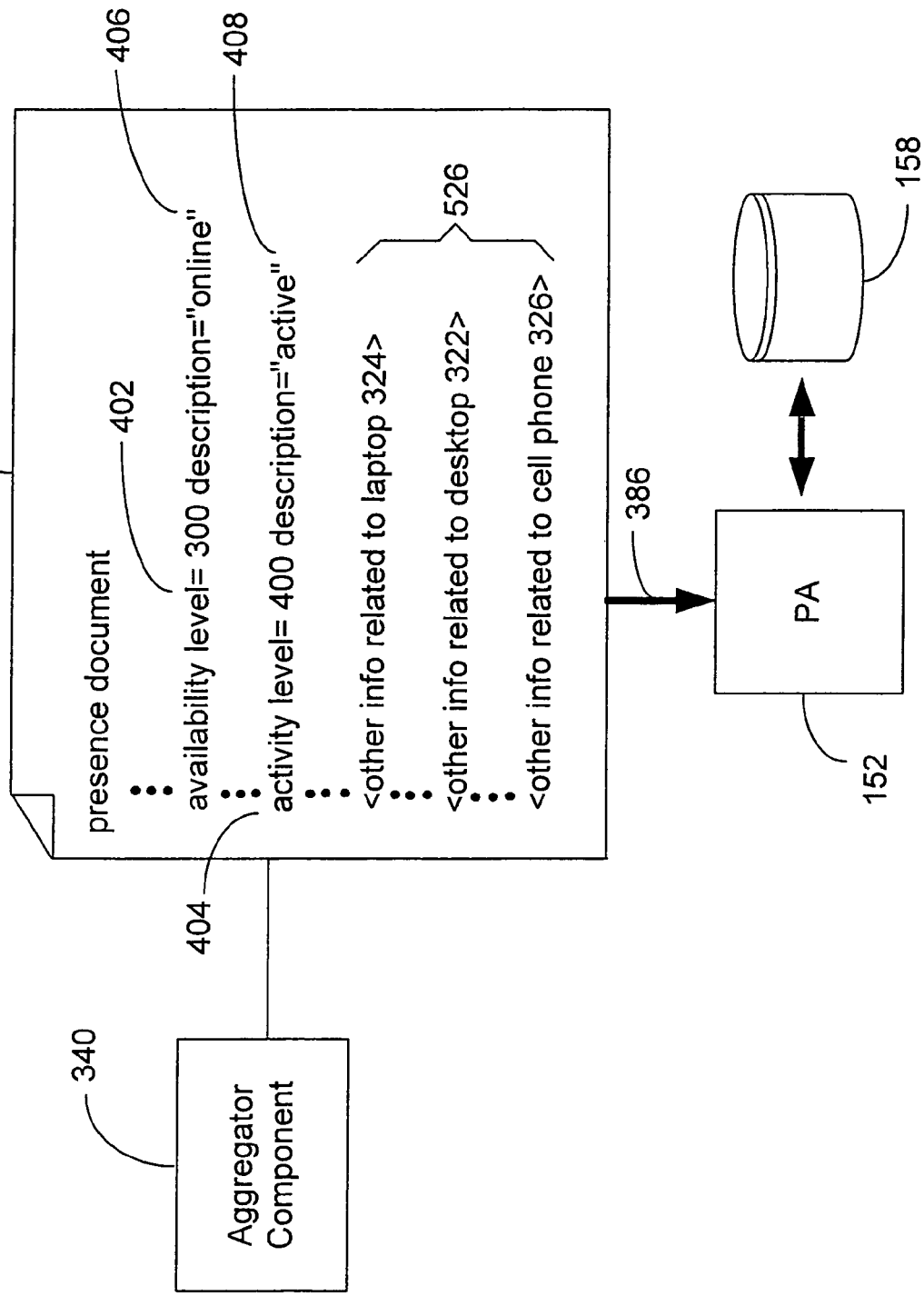

METHOD AND SYSTEM FOR SUPPORTING THE COMMUNICATION OF PRESENCE INFORMATION REGARDING ONE OR MORE TELEPHONY DEVICES

CROSS-REFERENCE TO RELATED APPLICATION(S)

This application is a continuation of U.S. patent application Ser. No. 10/145,912 entitled "METHOD AND SYSTEM FOR SUPPORTING THE COMMUNICATION OF PRESENCE INFORMATION REGARDING ONE OR MORE TELEPHONY DEVICES, filed May 15, 2002 now abandoned, which application is incorporated herein by reference in its entirety.

TECHNICAL FIELD

The invention relates generally to communication between computers over a network, and more particularly, to methods and systems for communicating the presence of one or more devices from over the network.

BACKGROUND OF THE INVENTION

With today's widespread use of the Internet as a primary communication medium, pre-existing communication devices are now being designed so that they are capable of communicating over packet-switched networks. For instance, telephones, pagers, cell phones, handheld computers, and even fax machines can now be accessed and controlled from over the Internet. Communication over a packet-switched network using communication devices that traditionally communicate over a circuit-switched telephone network is generally known as network telephony, or IP telephony when an IP network is involved.

A user having several communication devices (e.g., a cell phone, laptop and handheld PC) can configure each of these devices to identify itself to the network using a single alias or identifier (e.g., username@b.com). In this way, the user is not limited to communicating with others via a single device, but instead has the ability to communicate via several different devices. Nonetheless, the ability for a user to have several devices "present" on a computer network creates a need for other users to be able to determine the status or state of the user's many devices.

"Presence" refers to the availability, proximity, activity level or operating state of a user on a network. The ability for users to monitor each other's presence is a feature offered in connection with many applications that support network telephony. For example, instant messaging applications such as MSN or Yahoo have an "available buddy" feature, in which a user of the application can determine whether select users are available for engaging in communication. The data retrieved and returned to the buddy list, e.g. "John OFFLINE" or "Susan ACTIVE," is known as "presence information," and is generally maintained by a program called a "presence agent." According to most conventional network configurations, the presence agent is implemented as a dedicated server. Typically, the presence agent supports network telephony protocols such as the session initiation protocol (SIP). Device users can register their devices with the presence agent (e.g., via a registrar module) in order to have their presence maintained and to allow various programs on the network to facilitate network telephony services. As such, a first device user wishing to detect the presence of a second device user does so by "subscribing" with the presence agent, such as via a SIP SUBSCRIBE message. The presence agent intermediates between the first user, also known as the watcher, and the second user to facilitate the communication of the second device user's presence information to the first device user.

The ability of a presence agent to accurately determine and maintain presence information for one or more users significantly enhances communication and task completion over the network. For example, a very mobile user may only be on the network at certain times throughout the day, and may be accessing the network from varying locations. By subscribing as a watcher of this mobile user, it becomes possible for another user to detect the presence of the mobile user during the times at which the mobile user's computing device is actually connected to the network. So, when the mobile user is present, the watcher can correspond instantly with the mobile user via a chat session or videoconferencing call, as opposed to resorting to a non-real-time communication such as e-mail messaging. Hence, presence is an especially important factor for facilitating communication between users. Unfortunately, however, conventional presence agents are unable to determine presence with sufficient granularity. As an example, consider a scenario where a second user has subscribed with a presence agent as a watcher of a first user. If the first user is in the second users' available buddy list, and the first user's computing device suddenly goes into sleep mode, the second user's buddy list should still indicate that the first user's device is available for communication rather than indicate that the first user's device is "offline." An indication of "offline" does not accurately reflect that the first user's device may still be connected to the network and may still be able to receive messages. Yet, many presence agents only provide generalized presence information, such as "offline" or "unavailable," and do not account for more ambiguous presence conditions.

Some other presence agents attempt to more accurately present presence information by shortening the subscription periods of watchers. According to this mode of operation, when a watcher subscribes with the presence agent, the watcher's subscription time is minimized (e.g., by using a shortened timeout period), and so the watcher must frequently renew the subscription. Each time the watcher renews, the watcher receives the most current presence information. While this method of presence determination can be effective for detecting subtle changes in presence, the constant updating of subscriptions causes the presence agent to use more bandwidth and increases its overall processing time. Furthermore, this method increases the message load on a server that operates the presence agent resulting in a significant reduction in scalability.

Still further, many presence agents are unable to provide accurate presence information for those users who have several devices registered and present upon the network. Current standards for retrieving presence information pertaining to multiple device users simply call for the presence of each individual device to be determined, and then presented to the watcher as a compound document, such as an HTML file. As a result, the watcher that receives the compound document indicating the presence information for each device must "guess" which device's presence information most accurately reflects the presence of the user. However, just because a user's mobile phone, pager, laptop, PDA, and desktop computer are all present on the network does not mean the user is using all of them. Indeed, the presence information of the individual devices says very little about the actual presence (e.g., activity or availability) of the user.

SUMMARY OF THE INVENTION

The invention presents a method and system for detecting and communicating the presence of one or more users on a computer network. This includes users who employ devices that communicate over a network via the SIP protocol, and other common network protocols. The present invention also relates to a method and system for aggregating the presence information of multiple devices associated with a single user such that more accurate and useful presence information pertaining to the user can be determined.

In accordance with an embodiment of the invention, a network device, such as a server, is equipped with a presence agent that facilitates the exchange of presence information between a first user and a second user. The first user is referenced by a unique alias, such as user@some_network.com, and has one or more computing devices registered with the network server (e.g., via a registration module or dedicated registrar server). When the second device wishes to access presence information pertaining to the first user, the second user employs a computing device to send a subscription request to the network server in order to become a "watcher" of the second device user. Once received, the subscription request is then forwarded to the presence agent operating upon the network device for processing. The network device then generates and submits an acceptance message to the first user's device, followed by a standard NOTIFY message. As such, acceptance of the subscription is sent to the second user regardless of whether or not the second user is actually granted access to the presence information, as determined according to access preferences specified by the first user.

In order to grant access to the second user, the presence agent checks an access control list (ACL) that comprises one or more access rules or preferences. The first user defines these rules in order to affect how its presence information is shared with one or more watchers. When the ACL specifies that the second user may access the presence information, the NOTIFY message includes a presence document that contains the presence information. In contrast, when the ACL specifies that the watcher is not to access the presence information, the NOTIFY message is sent to the watcher without the presence document. Because the network server always sends an acceptance and notification message to the watcher, the subscription process is facilitated without any intervention by the first user, thus minimizing the processing requirements of the presence agent.

In accordance with another embodiment of the invention, the presence agent operating upon the network device maintains an offline subscribes data structure for storing information associated with any subscription requests submitted by one or more users wishing to access the first user's presence information. The subscription information is stored into the data structure whether the first user to be watched is or is not present (e.g., inactive, logged off), and includes data such as a URI (uniform resource locator) that uniquely identifies a particular subscriber. As such, when resuming upon the network again, the first user's one or more computing devices send a subscribe request to the network device in order obtain any data stored in the offline subscribes data structure. In response to this request, the presence agent operating upon the network device accesses the offline subscribes data structure, extracts the data, and forwards a NOTIFY message to the first user's device along with the data. When the first user authorizes the subscription, the registered device user updates its presence document, and forwards it to the network device. The network device then updates the ACL accordingly, and a NOTIFY message is sent to the subscribing user along with a presence document containing the presence information. On the other hand, when the subscription is not acceptable, the ACL is updated to specify prevention of access by the subscriber, resulting in a NOTIFY message being sent to the subscriber without any presence information.

In yet another embodiment of the invention, an aggregator component executed by the network device aggregates the presence information of several devices associated with a user into a single presence document. For user's that employ several computing devices (e.g., PDA, cell phone, laptop, and pager), a presence document for each individual device is generated and sent to the presence agent operating upon the network device for processing. Upon receiving these documents, the network device executes an aggregator component that performs a computation to determine the presence priority setting of each document. The presence priority setting of a document is a value that is determined according to attributes that include an activity level and an availability level. The activity level indicates what action the first user or corresponding device may be engaged in (e.g., idle, away), giving an indication of the likelihood of calls or messages actually being accepted from over the network. In relation to the activity level is the availability level, which indicates whether the user or user's corresponding computing devices may actually receive calls based on various network conditions (e.g., offline, online). A description attribute may optionally be associated with the activity or availability level to provide a functional or plain-language description of the assigned level. By summing up these values, the aggregator component identifies which device has the highest presence priority setting, and merges the presence information of each device into a single, or aggregate, document. The resulting presence information contained within the single document indicates to the watcher which of the user's devices most accurately reflects the presence of the user.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 6-8 illustrate the operation of an aggregator component for processing one or more presence documents.

DETAILED DESCRIPTION OF THE INVENTION

Figure 1:
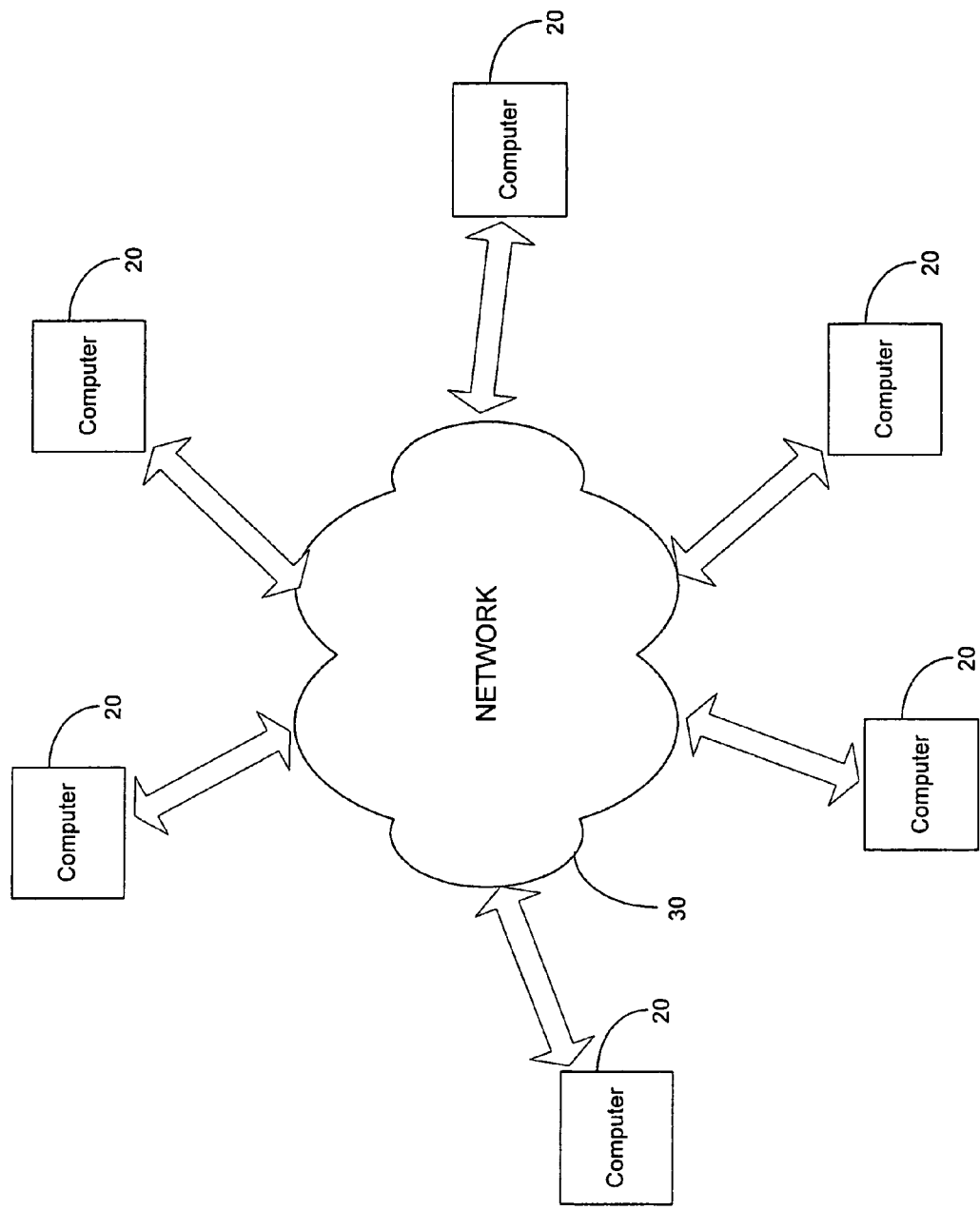
FIG. 1 is an example of a computer network.

The invention relates to a method and system for detecting and communicating the presence of one or more users on a computer network. Also, the invention relates to a method and system for aggregating the presence information of multiple devices associated with a single user such that overall presence information pertaining to that user can be determined. In the context of the invention, presence information describes any data that specifies the availability, proximity, activity level or operating state of a computing device or corresponding user of the device from over the network. For example, presence information can be provided to a user of a computing first device (a watcher) in the form of a presence document, and analyzed by watcher to determine if a user of another computing device (a registered device user) is online or offline, busy or idle. This determination is dependent on various factors, including the current activity of the user being maintained, the present operating state of the computing device of the user being monitored, etc. In an effort to stay consistent with common terminology used in the computing industry, this detailed description will use the term "presence" synonymously with the term "presence information" at various times. Moreover, the terms "presence" or "presence information" should be interpreted as relating to the user, or one or more devices employed by the user.

Also, the invention will be described throughout the course of the description with respect to SIP as a messaging protocol for supporting communication between devices in accordance with the teachings of the invention. Once again, those of skill in the art will recognize that SIP is only one protocol suitable for supporting network telephony and presence, and that other protocols may just as easily be utilized. Other such protocols include the H.323 standard and the Single Computer Telephony Protocol (SCTP). The invention is not limited to any one protocol or messaging implementation, as any means or medium by which two or more devices may communicate to support network telephony applications is suitable. Furthermore, the invention is not limited to any particular network telephony configuration, as any means for exchanging messages between one or more computers via SIP or the like is suitable for use in connection with the invention. This includes network configurations where computing devices such as proxies, redirect servers, registration terminals, presence servers and agents, and one or more clients or "presentities," are involved in the communication.

As used herein, the term "network telephony" relates to any process wherein a network, such as the Internet, is used as a transmission medium for placing telephone calls or facilitating multimedia sessions between two or more computing devices. This can include multimedia sessions where streaming media (e.g., audio and video data) is exchanged over the network, conference calls, virtual meetings, and other telephony sessions. The term "network telephony" is generic, and can therefore describe or pertain to several other communication processes involving the exchange of packetized data. These include, but are not limited to, IP telephony, Voice over the Internet (VOI) and Voice over IP (VOIP). Also, as used herein, the term "call" (e.g., telephone call) relates to a session in which an exchange of information is commenced or initiated between two or more computing devices over a network, such as with the aide of a telephony application (e.g., MICROSOFT NETMEETING™). In the context of the present invention, a "call" is synonymous to a "message" being sent between devices, and those terms will be used interchangeably at times to describe the interaction between two or more devices over the network.

An example of a networked environment in which the invention may be used will now be described with reference to FIG. 1. The example network includes several computers 20 communicating with one another over a network 30, such as the Internet, as represented by a cloud. Network 30 may include many well-known components, such as routers, gateways, hubs, etc. and may allow the computers 20 to communicate via wired and/or wireless media.

Figure 2:
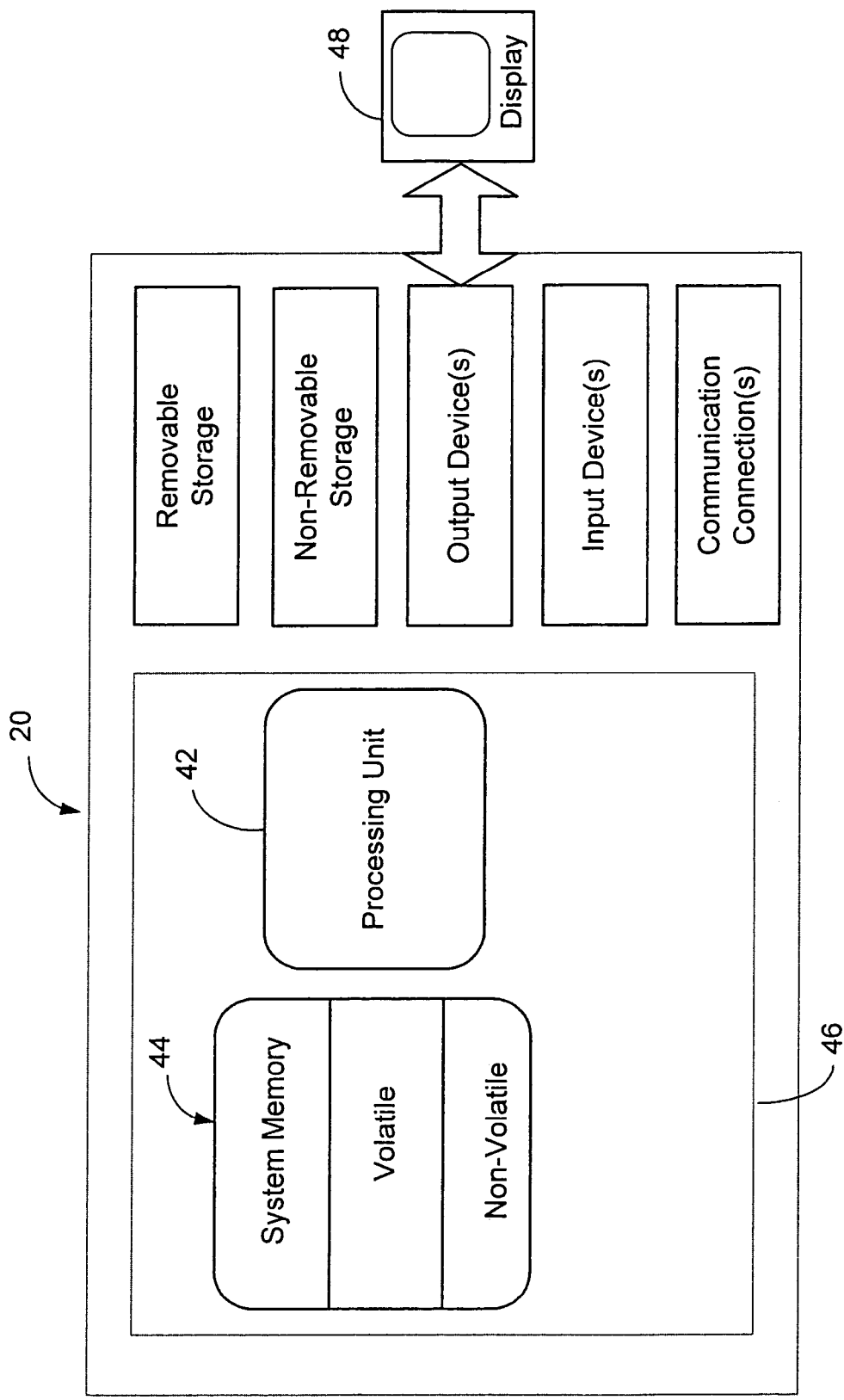
FIG. 2 is an example of a computer.

Referring to FIG. 2, an example of a basic configuration for a computer on which the system described herein may be implemented is shown. In its most basic configuration, the computer 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computer may also have other features/functionality. For example, computer 20 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 20. Any such computer storage media may be part of computer 20.

Computer 20 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 20 may also have input devices such as a keyboard, mouse, pen, voice input device, touch input device, etc. Output devices such as a display 48, speakers, a printer, etc. may also be included. All these devices are well known in the art and need not be discussed at length here.

Figure 3:
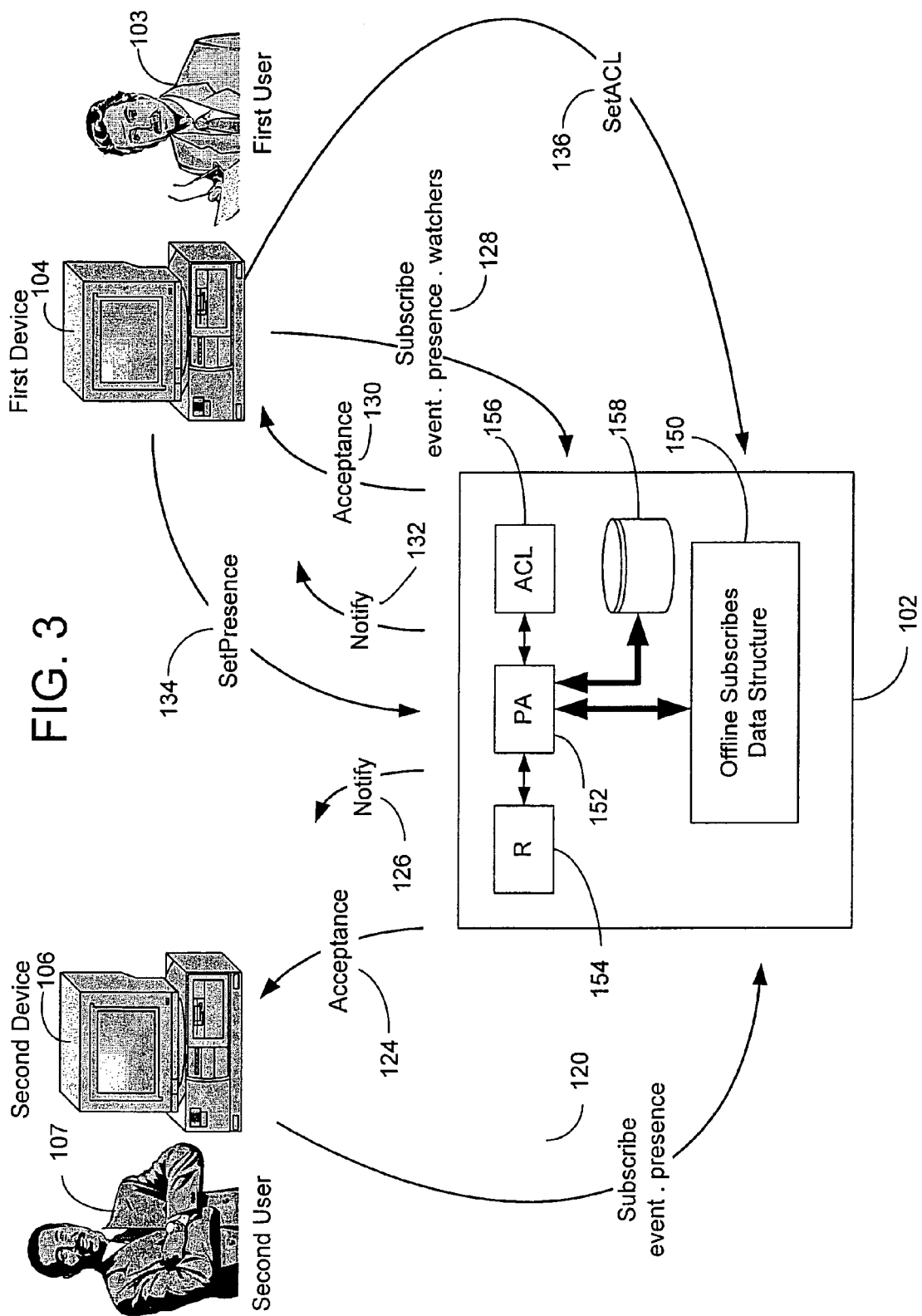
FIG. 3 is a diagram illustrating a server facilitating a call between a first computing device and a second computing device over the network in accordance with an embodiment of the invention.

In accordance with an embodiment of the invention, a server provides presence information regarding a first computing device, which is registered with the server, to a second computing device which operates as a watcher, as illustrated in FIG. 3. The server, labeled 102, is a computing device that is capable of processing messages conforming to a protocol for supporting telephony (e.g., SIP, H.323). The first computing device, labeled 104, and the second computing device labeled 106 are devices capable of communicating with one another over a computer network using network telephony. A first user 103 uses the first computing device 104, while a second user 107 uses the second computing device 106. In order to support the communication of presence information, the server 102 includes various components, such as a program referred to as a presence agent (PA) 152, a registration program (R) 154, and an access control list (ACL) 156. The presence agent 152 receives requests for presence information from one or more computing devices that act as "watchers," responds to the requests, and generates notifications of changes in the presence of computing devices being "watched". To maintain that presence information, the server 102 includes a memory 158 for storing the data. The registration program 154 processes registration request messages (e.g., an SIP REGISTER messages) received from over the network. Registration messages are sent to the registration program 154 by computing devices that are new to the network, and serve to "introduce" such new devices to the presence agent program 152. Operating in connection with the presence agent 152 and registration program 154 is the access control list 156. The ACL 156 may be implemented as a data structure, database, or even as a program, and is referenced by the server 102 to allow the server 102 to determine how it is supposed to interact with other devices on the network.

As shown in FIG. 3, the first user 103 operates the first computing device 104 to establish register with the server 102. The registration program 154 handles this registration process. In some embodiments, the registration program 154 is implemented as a dedicated computing device known as a registrar (not shown), which operates in conjunction with a proxy server that handles SIP messages. Any mechanism by which the first user 103 may register one or more devices in order to facilitate network telephony services, and particularly the communication of presence information, is within the scope of the invention.

The first computing device 104 executes a program, referred to as a presence user agent (PUA) that generates presence information relating to the first user 103. The PUA may be implemented on hardware/firmware as part of a stand-alone program or operating system. It may also be implemented as part of other software applications such as e-mail utilities, instant messaging software, network monitoring programs, video/audio conferencing programs, etc. When the second user 107 wishes to gain access to the presence information of the first user 103, the second user 107 interacts with the second computing device 106 to generate a SUBCRIBE message. The second computing device 106 sends the message to the server 102 (event 120). The SUBSCRIBE message alerts the server 102 that the second user 107 wants to "subscribe" as a watcher of the first computing device 104 and the corresponding first user 103. In various embodiments of the invention, the subscribe message contains an event header that specifies presence as the basis for the subscription request (e.g., event.presence). The event header causes the presence agent 152 to initiate a call to the server 102 to process the message as a presence subscription (as opposed to some other type of network event). In response to the subscription request, the server 102 (acting as a presence agent on behalf of the first computing device 104) stores the contents of the request into a data structure 150, referred to as an offline subscribes data structure. The offline subscribes data structure 150 is implemented as a file, record, table, index or any other scheme or mechanism for organizing data. Subscription information pertaining to each subscriber (e.g., URI, network address information of the subscriber) is stored in the offline subscribes data structure 150, allowing it to act as a persistent record of the subscription requests. In this way, the subscription information is maintained so as to be readily accessible to the presence agent 152.

After the subscription request is stored into the offline subscribes data structure 150, the server 102 makes a determination as to whether to accept the subscription request. This determination is made according to rules or conditions defined by the first user 103, which are maintained in the access control list (ACL) 152. In general, the ACL 152 includes access preferences that informs the server 102 as to which permissions, or access rights, a particular user or group of users has with respect to a particular resource—in this case, the presence information related to the first computing device 104 and first user 103. The actual settings of the ACL 152 as defined by the first computing device 104 will be described in a later section of this description. When the subscription message is accepted, the presence agent 152 generates an acceptance message, such as a SIP 202 message (event 124) and a NOTIFY message (event 126), which the server 102 sends to the second computing device 106. For standard telephony protocols such as SIP, the body of the NOTIFY message contains the presence information of the first computing device 104 and/or of the corresponding first user 103. If the presence agent 152 rejects the request, the presence agent 152 generates an acceptance message (e.g., a SIP 202 message) in the same manner as when the request is accepted. However, the server 102 does not send presence information to the second computing device 106, but rather sends a NOTIFY message containing no presence information. As a result, the second user 107 is allowed to subscribe as a watcher of the first user 103, but does not gain access to the presence information.

According to an embodiment of the invention, access to presence information pertaining to the first user 103 and/or the corresponding first computing device 104 is limited only to those users specified by the ACL 156. Since the server 102 accepts all subscription requests, access to the presence information of the first computing device 104 and/or the first user 103 is not dependent upon the first computing device 104 or first user 103 actually being present. In other words, it is possible for the first computing device 104 or first user 103 to not be present upon the network (e.g., logged off, disconnected, or in a busy state) without jeopardizing the ability of another device to subscribe as a watcher. In conventional systems, the absence of the first computing device 104 results in all SUBSCRIBE requests received by the server 102 being rejected. Consequently, in such systems the watcher must resubmit the request periodically until the subscription is finally accepted. Obviously, this is not desirable as this phenomenon increases the amount of traffic to be handled by the server 102, and, ultimately reduces its scalability.

The server 102 overcomes this challenge through the use of the offline subscribes data structure 150. When the first computing device 104 and the first user 103 resume their activity upon the network after having previously not been present upon the network, the first computing device 104 sends a SUBSCRIBE request to the server 102 to obtain any data stored in the offline subscribes data structure 150 (event 128). This subscribe request differs from the subscription request transmitted by the second computing device 106 for obtaining presence information (event 120). In that, the subscribe message sent by the first computing device 104 indicates to the server 102 that the first computing device 104 wishes to determine which other devices, if any, have attempted to monitor its presence or that of the first user 103 during the offline period. In response to this request, the server 102 accesses the offline subscribes data structure 150, extracts the data, and forwards an acceptance message to the first computing device 104 followed by a NOTIFY message (events 130 and 132). The body of the NOTIFY message contains the data from the offline subscribes data structure, such as a list of the subscribers and their corresponding network address information. Armed with this information, the first computing device 104 is able to recognize all of the computing devices and users that subscribed as watchers during the time it was not present on the network.

Once the first computing device receives the list of subscribers obtained from the offline subscribes data structure, the first computing device 104 and/or the first user 103 determines whether to accept or reject the subscription requests. The first user 103 makes this determination by responding to message prompts generated to a display screen 110 of the first computing device 104 by a presence enabled program (e.g., the PUA). In this scenario, the first user 103 responds using an input device such as a mouse or keyboard. Subscription requests can also be accepted or rejected by the first computing device 104 automatically, without user intervention, according to the preferences or auto-settings of the first computing device 104. When a subscription request is accepted, the first computing device 104 generates an updated presence document, which is a file that contains the presence information, and forwards it to the server 102 (event 134). The presence agent 152, operating on the server 102, processes the contents of the presence document, and stores the presence information obtained from the document into an accessible memory location 158 for subsequent retrieval. Also, upon receiving the presence information, the ACL 156 is updated to indicate that the second user 107 has been permitted to act as a watcher of the first computing device 104 and the first user 103 (event 136). As such, the second computing device 106 may freely access the presence information of the first computing device 104 and first user 103. On the other hand, if the subscription is not accepted, the ACL 156 is updated to indicate that the second user 107 is not to have access to the presence information (event 136). No subsequent NOTIFY message is sent to the second computing device 106 in this case, ensuring that the second user 107 is not aware of the presence of the first computing device 104 or first user 103.

In the foregoing paragraphs, the operation of the server 102 for facilitating the communication of presence information is described. To ensure the most accurate portrayal of presence information to a watcher, in various embodiments of the invention the first computing device 104 is able to insert descriptive presence information into any updated presence document and transmit the presence document to the server 104 to the presence agent 152 Further, the server 102 recognizes the differences between the updated presence document and previous versions of the presence document to the presence document and based on these differences, more accurately portrayal the presence of the first computing device 104 and/or the first user 103. Also, the first computing device 104 is able to update the ACL 156 to control the extent to which other devices may access the presence information maintained by the server 102. In the following paragraphs, the mechanisms employed by the first computing device 104 and server 102 for setting presence and controlling access to the presence information is described. This functionality is presented in FIGS. 4-5.

Setting and Updating Presence Information

Figure 4:
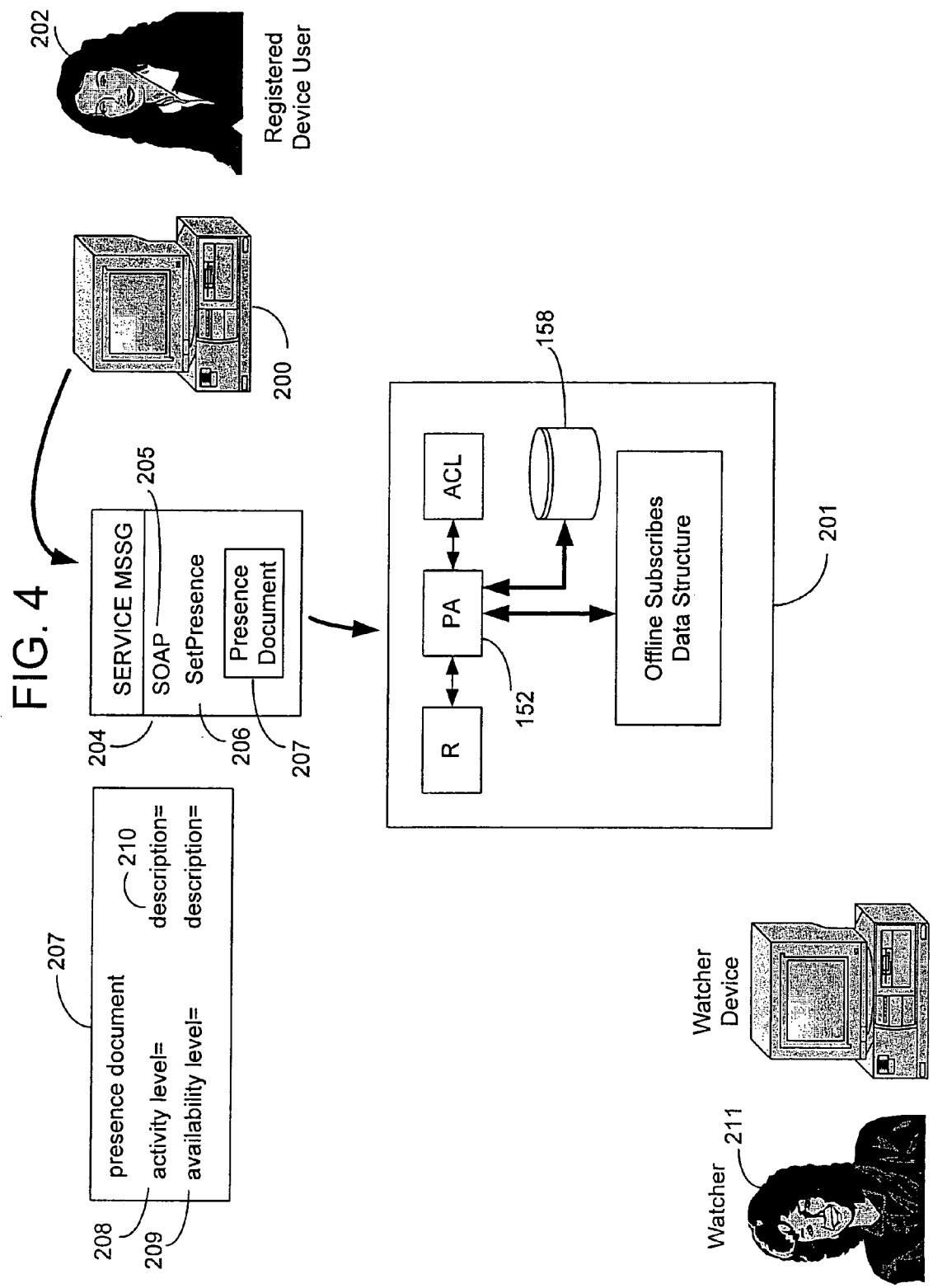
FIG. 4 is a diagram illustrating the mechanism employed by a first computing device of FIG. 3 for setting presence with a server according to an embodiment of the invention.

Referring now to FIG. 4, a computer network includes a first computing device 200 that is operated by a first user 200, a server 201, and a second computing device 211 having that is operated by a second user 210. Each of these components has much of the same functionality as those of FIG. 3, with additional features described in the following paragraphs.

The first computing device 200 is capable of generating presence information and exchanging it in the form of a presence document with the server 201 in accordance with an embodiment of the invention. The presence document 207 contains information pertaining to the presence of the first computing device 200 and first user 202. Specifically, the first computing device 200 submits the presence document by sending a SERVICE message 204 to the server 201 (event 300). The service message 204 conforms to a standard telephony protocol format such as SIP, and comprises instructions within the message body for initiating the Set Presence remote procedure call. The Set Presence procedure call is a function or method executable on the server 201, that causes the agent 152 operating on the server 201 to set (update) the presence information for the first user 202 and the first computing device 200 in memory 158. Preferably, the service message supports the exchange of complex object types and not just text. Suitable protocols or mechanisms for supporting the transmission of complex objects include, but are not limited to, Internet Inter-ORB Protocol (IIOP), COM/DCOM based protocols, and the Simple Object Access Protocol (SOAP). In the illustrated embodiment, the Set Presence procedure call is contained within a SOAP envelope within the message body. SOAP allows remote procedure calls to be embedded within messages (as a SOAP envelope), and invoked by a receiving device. Several Set Presence calls may be indicated within a single SOAP envelope in order to permit several devices to update their presence information simultaneously.

In further accordance with an embodiment of the invention, the presence document 207 generated by the first computing device 200 is comprised of one or more attributes that relate to the presence of the first computing device 200 or corresponding first user 202. Such attributes include an availability level 208 and activity level 209. Also, in association with the availability level 208 and activity level 209 is the description attribute 210. The description attribute provides a functional or plain-language description of the assigned activity or availability level, and is specified at the discretion of the first computing device 200. For each presence document generated by a computing device related to the first user 202, one activity level and availability level is specified. By specifying these attributes within the presence document 207, the server 102 is able to provide a more accurate indication of the presence for the first computing device 200 or first user 202 to a user 211 that is acting as a watcher.

The availability level 208 is an attribute that indicates whether the first computing device 200 or first user 202 may actually receive calls. The first computing device 200, specifies various availability levels, including those shown in TABLE 1 below. Yet, only one availability level need be specified for a single device at a time.

TABLE 1

| Availability level settings | | |
|---|---|---|
| Availability Level | Associated Description of Availability Level | Explanation |
| 000 | Offline | The user cannot receive calls. |
| 100 | Undetermined | The user may be online, but there is no way to know until a call is attempted. |
| 200 | Connected | The user has a device currently connected that can receive calls. |
| 300 | Online | The user is in proximity to a device that can receive calls. |

The availability levels are spread into classes, where each class is a multiple of 100. This is analogous to the response code numbering system used in communication protocols such as the hypertext transfer protocol (HTTP) and SIP. Those skilled in the art will recognize, however, that different values or classes may be used to specify the availability level of the first computing device 200, and that the invention is not limited to any specific implementation. For example, the first computing device 200 may want to indicate a greater level of availability than "online," but may not want to show an availability of "always," and create a new availability value 250: "likely to take call". If the second computing device 211 is not familiar with this particular attribute receives such presence information, it can abstract it to a class in which is it familiar (e.g., it can generalized to 200: "connected").

The activity level 209, provides an indication of the action in which the first computing device 200 or corresponding first user 202 is engaged. Also, the activity level 209 indicates to the second computing device 211 or other devices that are in the role of watchers the likelihood of calls or messages being accepted by the first computing device 200 or first user 202. Various activity levels may be specified within the presence document 207, as shown in Table 2 below.

TABLE 2

Activity level settings

| Activity Level | Associated Description of Activity Level | Explanation |
|---|---|---|
| 000 | No explicit activity | There is no information about the activity of the user. |
| 100 | Away | The user is away from the device |
| 150 | At lunch | The user is taking a lunch break |
| 200 | Idle | No specific activity is currently being engaged |
| 300 | Temporarily unavailable | The user is not available at the present time |
| 400 | Active | The user is active |
| 500 | In call | The user is already participating in a communications session. |
| 600 | Busy | The user is busy |
| 700 | Do not disturb | The user does not want to participate in a communication session |
| 800 | Always interruptible | User will stop whatever they're doing to receive a call. |

Again, those skilled in the art will recognize that the invention is not limited to the set of values or activity classes shown in TABLE 2. Also, it Will be recognized by those skilled in the art that specifying the activity level 209 of the 208 first computing device 200 or user 202 in connection with the availability level ensures for more accurate presence. This is in contrast with many existing systems for conveying presence information, in which less useful presence attributes are provided. For example, if a presence document only indicates that the user is "busy," this is not sufficient information for the watcher 211 to determine if calls can actually be placed with the first computing device 200. Just because the first user 202 is busy does not mean that calls are not to be received from the second computing device 210. Various embodiments of the invention account for such intricate distinctions in presence by indicating both the activity level (e.g., busy or active) and availability level (e.g., connected) of a computing device and/or its corresponding user.

Setting the Access Control List (ACL)

Figure 5:
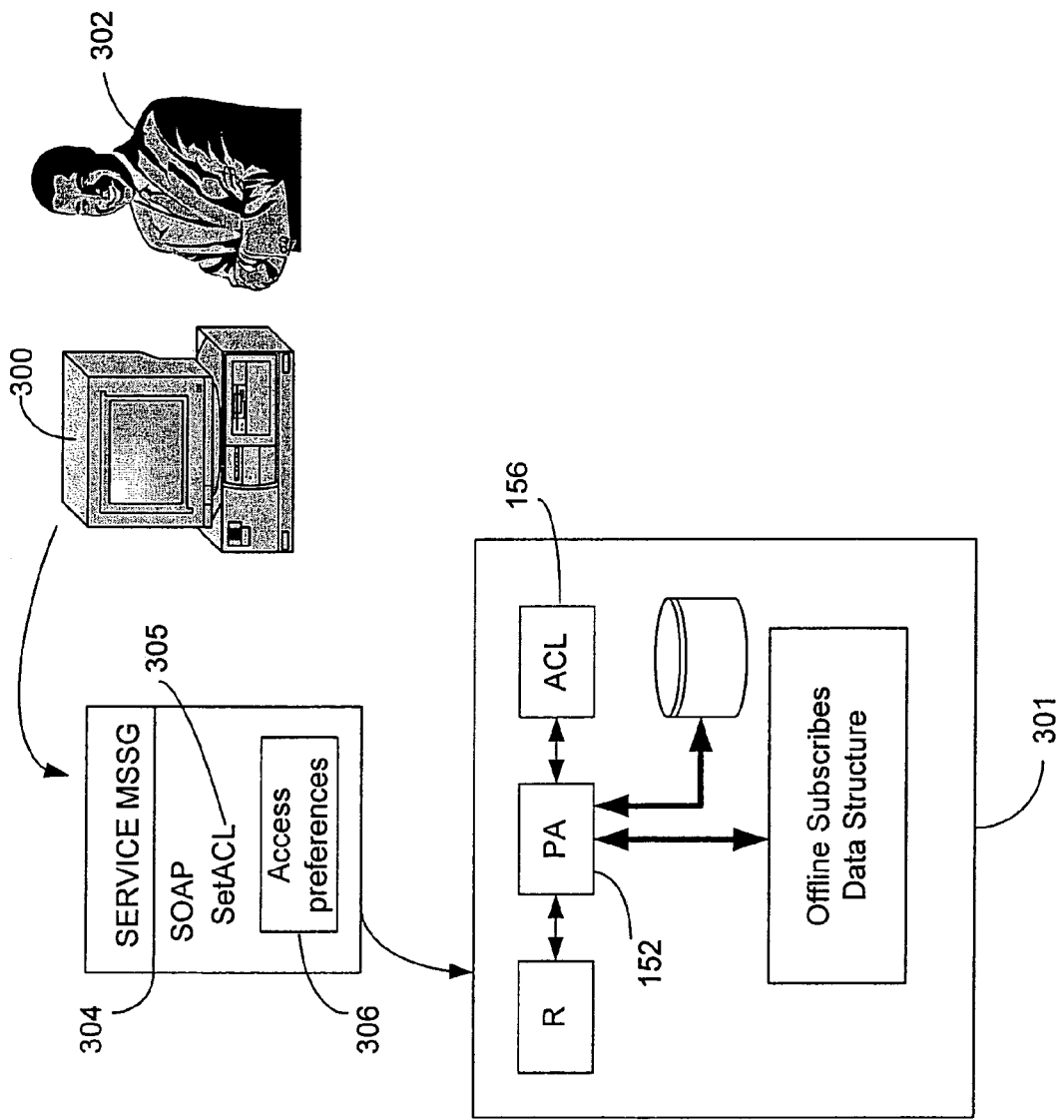
FIG. 5 is a diagram illustrating the mechanism employed by a first computing device of FIG. 3 for setting access preferences with a server according to an embodiment of the invention.

As described earlier with respect to FIG. 3, when a computing device is not present or a network, but later resumes its activities upon the network, it can access a data structure from the network device to determine which users have subscribed to watch it. At this point, the computing device or its corresponding user decides whether to allow the one or more subscribers access to its presence information. The decision is made known to the server that is handling presence administration for the network device by way of an access control list (ACL). In accordance with another embodiment of the invention, a computing device sets its access preferences with a server via a Set ACL procedure call, as illustrated in FIG. 5.

The Set ACL procedure call is an executable function or method that specifies the ACL settings for the computing device 300 of the network shown in FIG. 3. As shown, the computing device 300 submits a SERVICE message 304 to a server 102 in order to initiate the setting, or updating, of the ACL 156. The SERVICE message comprises one or more setACL procedure calls 305, which trigger the presence agent 152 operating on the network device 102 to set (update) the ACL 156. Similar to the Set Presence call described above, the setACL procedure call is contained within a SOAP envelope that comprises the body of the SERVICE message. Multiple setACL calls may be contained within a single service message 304 in order to authorize one or more subscribers. When the network device 102 receives the SERVICE message, the presence agent 152 processes it, and the access preferences 306 indicated by the service message 304 are stored within the ACL 156.

The concept of access control as it applies to this embodiment of the invention will now be discussed in more detail. For each user or group of users of a network, there is a corresponding access control list that specifies what that user or group of users is permitted to do with regard to other users or groups of users. In this embodiment of the invention, there are at least two types of rights: "Incoming" and "Presence." Incoming rights govern things such as who is permitted to initiate communication with the user. Presence rights govern the ability for a user to monitor whether another user is online. The values to which each of these rights can be set in an embodiment of the invention are as follows:

| Right | Value | Abbreviation | Meaning |
|---|---|---|---|
| INCOMING | Allow | "A" | User having this level of access can invite another user to communicate. |
| | Timeout | "T" | User having this level of access can invite another user to communicate, but the user's real-time communication client program will always timeout the call. This is a polite way of blocking the and equates to the phone "ringing off the hook". |
| | Deny | "D" | User having this level of access cannot invite another user to communicate. |
| PRESENCE | Allow | "A" | A user can query or subscribe to another user's presence and will be notified when status changes occur |

-continued

| Right | Value | Abbreviation | Meaning |
|---|---|---|---|
| | Prompt | "P" | A user having this level of access can attempt to subscribe to another user's presence, but the other user will be prompted for permission |
| | Block | "B" | A user having this level of access may subscribe to another user's presence, but the other user will always appear to be offline. |
| | Deny | "D" | A user with this level of access cannot even subscribe to the other user |

Continuing the discussion of access control, a user or a group of users will also be referred to herein as an "identity." There are many possible ways to designate an identity. In an embodiment of the invention, the following types of identities exist.

| Identity Type | Meaning |
|---|---|
| ALL | All users and groups. |
| DOMAIN | All users in this domain |
| URI | Used to specify a particular user. |

Each access control list has one or more access control entries. Each access control entry confers one or more rights to an identity. For example, possible access control entries for the user joeb@microsoft.com include:

| Identity | Access Right(s) | Meaning |
|---|---|---|
| ALL | INCOMING = Allow | Anybody can communicate with joeb@microsoft.com |
| | PRESENCE = Prompt | Nobody can access the joeb's presence without joeb being prompted to grant permission. |
| DOMAIN "microsoft.com" | INCOMING = Allow | Anybody at Microsoft can communicate with Joeb |
| | PRESENCE = Prompt | Nobody at Microsoft can access the joeb's presence without joeb being prompted to grant permission. |
| URI "roberbr@microsoft.com" | INCOMING = Deny PRESENCE = Deny | The user roberbr@microsoft.com is specifically blocked from any access to joeb. |

According to an embodiment of the invention, the administrator of a network can set a "default" access control list that is applied to all users in a particular group. If an access control entry in the user's personal access control list has the same identity as an access control entry in the default access control list, then the personal access control entry takes precedent over the default access control entry. This merging is done at the server when a user's access control list is retrieved. Client software will only ever see the merged access control list. At install, according to an embodiment of the inventions, the default access control list is set to:

| Identity | Access Right(s) | Meaning |
|---|---|---|
| DOMAIN "<insert domain Name>" | INCOMING = Allow PRESENCE = Allow | Allow others in the user's domain full access to the user |
| ALL | INCOMING = Allow PRESENCE = Prompt | Defaults the access for all other users to allow incoming communication, but no access to presence without the owner explicitly granting |

The administrator may also set a "mandatory" access control list that is applied to all users in a particular group.

Up to this point, the invention has been described with respect to the interaction between one or more users that act as watchers, a computing device, and a corresponding user being watched. However, in many instances the user being watched may have more than one device (registered) with the network device at a time. In such cases, presence information is generated by each of the devices, resulting in several presence documents being generated and exchanged with the server that handles presence administration. For conventional servers, a watcher seeking to obtain presence information pertaining to a user of several devices would receive several individual presence documents. Or, in some instances, the watcher would receive a compound document that simply lists the presence of each device, and nothing more. According to another embodiment of the invention, however, an aggregator component executed by the server that handles presence administration aggregates the presence information of several devices pertaining to a single user into a single presence document. In this way, the watcher is able to obtain a more precise indication of the overall presence of the user. Operation of embodiments of the invention in which this technique is employed is described in the following paragraphs, and with respect to FIGS. 6-8.

Figure 6:
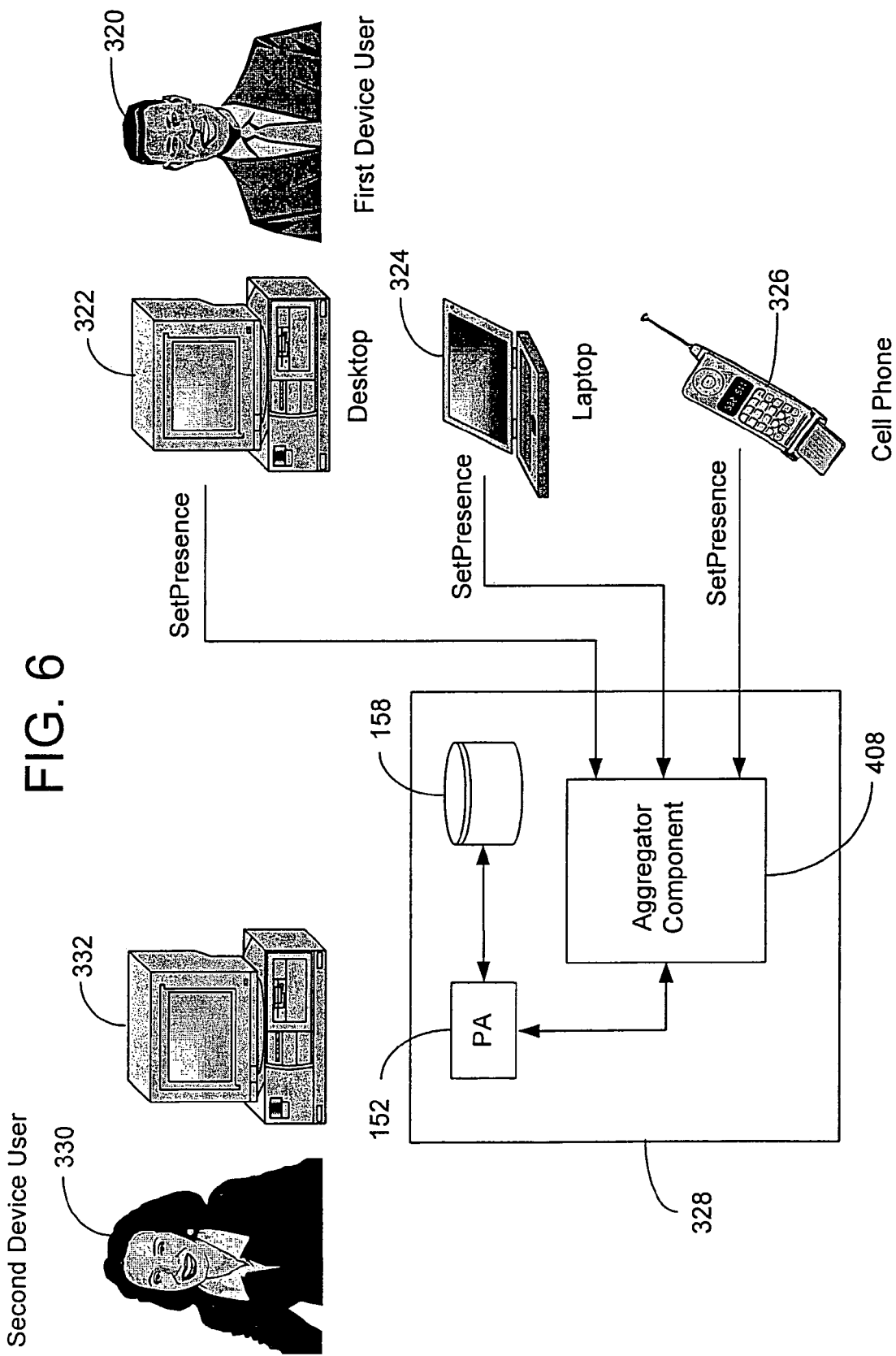

Referring now to FIG. 6, a user 320 employs several telephony devices, including a desktop computer 322, laptop computer 324, and cell phone 326. Each device is registered with a server 328, and generates presence information pertaining to itself and/or the corresponding user 320. To communicate the presence information with watchers 410 (or several watchers), each of the registered devices 322-326 submits a SERVICE message to the server 328 that allows it to invoke the Set Presence procedure call, as described earlier. Upon receiving the SERVICE messages (and corresponding presence documents), the server 328 executes an aggregator module 340 that analyzes each presence document to determine their respective presence priority settings. The presence priority setting is a value calculated using information specified in the presence document for a device, such as from the summation of the availability level 208 and activity level 209 of a presence document 207, to determine the level of presence of the respective device. A higher presence priority setting for a particular presence document indicates a higher degree of presence with respect to a particular computing device. It should be noted that a higher degree of presence is not strictly based upon numeric values, but rather to the meaning associated with a particular availability or activity level. By comparing the presence priority settings of several presence documents, the presence agent 152 can determine which document most accurately reflects the presence of the user 320 and the user's corresponding computing devices 322-326. In turn, the presence agent 152 conveys this information to the watcher 320 to ensure the watcher 320 has access to the most accurate presence information.

With respect now to FIG. 7, the aggregator component 340 operates upon the server 328 to interpret presence documents generated by one or more registered devices, in accordance with an embodiment of the invention. The aggregator component 340 is implemented as an executable module, such as a dynamic link library (DLL) or computer executable application that is capable of processing presence information. Presence information is generated by the registered devices (desktop 322, laptop 324 and cell phone 326), and conveyed as presence documents 350-354. As described previously with respect to the invention, each presence document comprises information such as an availability level, an activity level, description attribute and any other relevant presence information. Consider the presence document 350 generated by the desktop computer 322, for example, which specifies an availability level 356 equal to 300 and an activity level 358 equal to 000. The activity 358 and availability levels 356 provide an indication of the current state or operation of the desktop computer 322 or user 320, and correspond to the description attributes "online" 360 and "no explicit activity" 362 respectively. Also included within the presence document 350 is any other information 364 pertaining to the presence of the desktop computer 322, such as diagnostic data, user profile data, or the like. Like the desktop computer 322, the laptop computer 324 and cell phone 326 also generate presence documents in a similar fashion.

Once the server 328 receives the presence documents 350-354, the aggregator component 340 performs a computation to determine which document indicates the highest presence priority setting (event 380). More specifically, the aggregator component 340 calculates the presence priority setting for each document such as by comparing the indicated activity level and availability level values and setting the presence priority setting to that of the highest value. For example, the presence priority settings for the desktop computer 322, laptop computer 324 and cell phone 326 as calculated as shown in TABLE 4 below.

TABLE 4

Presence priority settings for the registered devices of FIGS. 6 and 7

| Device | Availability | Activity | Description |
|---|---|---|---|
| Desktop Computer 322 | 300 | 000 | online, no explicit activity |
| Laptop computer 324 | 200 | 400 | connected, active |
| Cell Phone 326 | 000 | 000 | offline, no explicit activity |
| Aggregate presence | 300 | 400 | online, active |

As TABLE 4 shows, the laptop computer 404 has a presence activity setting of 400, the highest of all the computing devices. This setting indicates to the presence agent 152 that the laptop computer 324 is connected to the network for receiving calls, and that the user 320 is actively using the laptop computer 326. Hence, while the desktop computer 322 and cell phone 326 are registered with the server 328, their presence priority settings indicate a lesser likelihood of them engaging in a communication session (e.g., the user 320 is not currently using these devices). In contrast, a higher presence priority setting more explicitly and accurately indicates the presence of the computing devices 322-326 and user 320.

The aggregator component 340 generates a single presence document that conveys overall presence information related to the single person who owns each of the computing devices 322-326 (event 382). In accordance with yet another embodiment of the invention, this single presence document only specifies the highest availability and activity levels of the computing devices, as illustrated in FIG. 8. Thus, since the highest availability level of the three devices is 300, and the highest activity level of the three devices is 400, the aggregate availability and activity levels are 300 and 400. Hence, the single presence document is generated such that the presence agent can detect which of the user's computing devices 322-326 indicates the highest degree of presence upon the network. In this regard, the single (or aggregate) presence document 400 indicates the availability level 402, activity level 404 and corresponding description attributes 406 and 408 associated with the desktop computer 322 and the laptop computer 400, respectively. Additionally, the other presence information 156 related to each computing device is included within the single presence document 400 just as it was indicated in the original presence documents 350-354. This single presence document 400 is then passed to the presence agent 152 operating upon the server 328 (event 386), where it is stored in an accessible memory location 158 for subsequent retrieval.

Those skilled in the art will appreciate that the resulting single presence document generated by the aggregator component 340, and having an aggregate availability level of 300 and an aggregate activity level of 400, provides a more accurate indication of presence for users that employ several computing devices. Unlike conventional means for conveying the presence information of several computing devices, the single presence document indicates the presence information associated with each device (e.g., the other relevant information 526), but only reflects the highest availability and activity level of the devices. Consequently, the information that most accurately reflects the presence of the user is what ultimately gets conveyed to any watchers. It will also be appreciated by those skilled in the art that because the aggregator component 340 operates in connection with the presence agent 152, the presence agent can call upon the aggregator component to generate a new presence document in response to common tasks performed by the server 328. For example, the presence agent 152 can activate the aggregator component 340 whenever a REGISTER request is received by the server 328 from a computing device being operated by the user 320, or conversely when a REGISTER request expires. Also, the presence agent 152 in can activate the aggregator component 340 whenever the server 328 receives a new SERVICE message that requires processing. In this way, the most up-to-date presence information for one or more computing devices is continually maintained by the presence agent 152.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A presence agent system for processing requests to access presence information of a first computing device, comprising:
    a processor for executing computer executable instructions; and
    computer storage media storing:
    a component that receives from a second computing device a request to subscribe to presence information of the first computing device;
    a component that stores an indication that the second computing device has requested to subscribe to the presence information of the first computing device;
    a component that determines whether to accept the request of the second computing device to subscribe to the presence information of the first computing device;
    a component that when the request is accepted, sends to the second computing device an indication that the subscription has been accepted and the presence information of the first computing device; and
    a component that when the request is not accepted, sends to the second computing device an indication that the subscription has been accepted without sending the presence information of the first computing, the second computing device being allowed to subscribe to the presence information of the first computing device without gaining access to the presence information;
    wherein the determination as to whether to accept the request of the second computing device is made using an access control list provided by the first computing device; and
    wherein the access control list indicates to prompt the first computing device whether to accept a request from the second computing device.

2. The system of claim 1 wherein the access control list indicates to accept the request of the second computing device, but to always have the first computing device appear offline.

3. The system of claim 1 wherein the indication that the second computing device has requested to subscribe to the presence information of the first computing device is stored even though the first computing device is not currently online.

4. The system of claim 3 including a component that sends to the second computing device presence information of first computing device when the first computing device comes online.

5. The system of claim 3 including a component that, when the first computing device comes online, sends to the first computing device an indication that the second computing device requested to subscribe to the presence information of the first computing device while the first computing device was offline.

6. The system of claim 5 including a component that receives from the first computing device an indication of whether to accept the request.

7. The system of claim 6 including a component that, when the first computing device indicates to accept the request, stores an indication that the second computing device is allowed access to the presence information of the first computing device and sends to the second computing device presence information of the first computing device.

8. The system of claim 6 including a component that, when the first computing device indicates not to accept the request, stores an indication that the second computing device is not allowed access to the presence information of the first computing device and does not send to the second computing device presence information of the first computing device.

9. The system of claim 1 wherein the presence agent system is a presence server.

10. A computer system for tracking subscriptions to presence information of a first computing device while the first computing device is offline, comprising:
    a processor for executing computer executable instructions; and
    computer storage media storing:
    a component that receives from a second computing device a request to subscribe to presence information of the first computing device;
    a component that stores an indication that the second computing device has requested to subscribe to the presence information of the first computing device while the first computing device was offline;
    a component that receives from the first computing device an indication that the first computing device is online;
    a component that, upon receiving the indication that the first computing device is online, compares the request from the second computing device to an access control list and determines whether to accept the request of the second computing device to subscribe to the presence information of the first computing device based upon whether the access control list contains information identifying the second computing device;
    a component that determines whether to accent the request of the second computing device to subscribe to the presence information of the first computing device;
    a component that when the request is accepted, sends to the second computing device an indication that the subscription has been accepted and the presence information of the first computing device; and
    a component that when the request is not accepted, sends to the second computing device an indication that the subscription has been accepted without sending the presence information of the first computing device, the second computing device being allowed to subscribe to the presence information of the first computing device without gaining access to the presence information.

11. The system of claim 10 including a component that, upon receiving the request to subscribe, sends to the second computing device an indication that the subscription has been accepted without sending the presence information of the first computing device.

12. The system of claim 10 including a component that, when the first computing device comes online, sends to the first computing device an indication that the second computing device requested to subscribe to the presence information of the first computing device while the first computing device was offline.

13. The system of claim 12 including a component that receives from the first computing device an indication of whether to accept the request.

14. The system of claim 13 including a component that, when the first computing device indicates to accept the request, stores an indication that the second computing device is allowed access to the presence information of the first computing device.

15. The system of claim 13 including a component that, when the first computing device indicates not to accept the request, stores an indication that the second computing device is not allowed access to the presence information of the first computing device and does not send to the second computing device presence information of the first computing device.

16. A computer storage medium containing instructions for handling a request to subscribe to presence information of a first computing device, by a method comprising:
   receiving from a second computing device a request to subscribe to presence information of the first computing device;
   storing an indication that the second computing device has requested to subscribe to the presence information of the first computing device;
   determining whether to accept the request of the second computing device to subscribe to the presence information of the first computing device regardless of whether the first computing device is online;
   when the request is accepted, sending to the second computing device an indication that the subscription has been accepted and the presence information of the first computing device;
   when the request is not accepted sending to the second computing device an indication that the subscription has been accepted without sending the presence information of the first computing device; and
   when the first computing device comes online and the request was accepted, sending to the second computing device presence information of the first computing device;
   wherein the determination as to whether to accept the request of the second computing device is made using an access control list provided by the first computing device; and
   wherein the access control list indicates to prompt the first computing device whether to accept a request from the second computing device.

17. The computer storage medium of claim 16 including when the first computing device comes online, sending to the first computing device an indication that the second computing device requested to subscribe to the presence information of the first computing device while the first computing device was offline.

* * * * *

UNITED STATES PATENT AND TRADEMARK OFFICE
CERTIFICATE OF CORRECTION

| | | |
|---|---|---|
| PATENT NO. | : 7,493,390 B2 | |
| APPLICATION NO. | : 11/332507 | |
| DATED | : February 17, 2009 | |
| INVENTOR(S) | : Nikhil P. Bobde et al. | |

It is certified that error appears in the above-identified patent and that said Letters Patent is hereby corrected as shown below:

Title page, in field (56), under "U. S. Patent Documents" column 2, line 8, below "(Continued)" insert -- FOREIGN PATENT DOCUMENTS WO   9800787   8/1998 --.

Title page 2, in field (56), under "U. S. Patent Documents" column 1, line 41, below "2002/0052963 A1 5/2002 Abbott et al." insert -- 2002/0054130 5/2002 Abbott, III, et al. --.

Title page 2, in field (56), under "U. S. Patent Documents" column 1, line 42, below "2002/0054174 A1 5/2002 Abbott et al." insert -- 2002/0078204 6/2002 Newell, et al. --.

Title page 2, in field (56), under "U. S. Patent Documents" column 1, line 43, below "2002/0080155 A1 6/2002 Abbott et al." insert -- 2002/0080156 6/2002 Abbott, et al. --.

Title page 2, in field (56), under "U. S. Patent Documents" column 1, line 44, below "2002/0083025 A1 6/2002 Robarts et al." insert -- 2002/0083158 6/2002 Abbott, et al. --.

Title page 2, in field (56), under "U. S. Patent Documents" column 1, line 45, below "2002/0087525 A1 7/2002 Abbott et al." insert -- 2002/0099817 7/2002 Abbott, et al. --.

Title page 2, in field (56), under "U. S. Patent Documents" column 1, line 50, above "2003/0182052 A1 9/2003 DeLorme et al." insert -- 2003/0154476 8/2003 Abbott, III, et al. --.

In column 18, line 33, in Claim 10, delete "storing;" and insert -- storing: --, therefor.

In column 18, line 51, in Claim 10, delete "accent" and insert -- accept --, therefor.

In column 18, line 58, in Claim 10, delete "device;" and insert -- device: --, therefor.

Signed and Sealed this
Twelfth Day of July, 2011

David J. Kappos
*Director of the United States Patent and Trademark Office*